(12) United States Patent
Ikeshiro et al.

(10) Patent No.: US 11,421,097 B2
(45) Date of Patent: *Aug. 23, 2022

(54) CONTAINER SEALANT COMPOSITION

(71) Applicant: Henkel AG & Co. KGaA, Dusseldorf (DE)

(72) Inventors: Yasushi Ikeshiro, Kanagawa Prefecture (JP); Shigeki Hayashi, Kanagawa Prefecture (JP); Toru Takahashi, Kanagawa Prefecture (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 476 days.

This patent is subject to a terminal disclaimer.

(21) Appl. No.: 14/653,642

(22) PCT Filed: Dec. 19, 2013

(86) PCT No.: PCT/US2013/076409
§ 371 (c)(1),
(2) Date: Jun. 18, 2015

(87) PCT Pub. No.: WO2014/100342
PCT Pub. Date: Jun. 26, 2014

(65) Prior Publication Data
US 2016/0185936 A1 Jun. 30, 2016

Related U.S. Application Data

(60) Provisional application No. 61/739,831, filed on Dec. 20, 2012.

(51) Int. Cl.
C08K 3/34 (2006.01)
C08K 3/22 (2006.01)
C08K 5/09 (2006.01)
C08K 5/548 (2006.01)

(52) U.S. Cl.
CPC ............... C08K 5/09 (2013.01); C08K 3/22 (2013.01); C08K 3/346 (2013.01); C08K 5/548 (2013.01); C08K 2003/2241 (2013.01)

(58) Field of Classification Search
CPC . C08K 5/09; C08K 3/22; C08K 5/548; C08K 3/346; C08K 2003/2241; C08L 13/00
USPC .......................................................... 156/69
See application file for complete search history.

(56) References Cited

U.S. PATENT DOCUMENTS

| 4,189,418 | A |   | 2/1980  | Ueno et al. |
| 4,429,076 | A | * | 1/1984  | Saito ............... C08L 51/006 525/301 |
| 5,747,579 | A |   | 5/1998  | Blakeman et al. |
| 5,763,388 | A | * | 6/1998  | Lightsey ............ C08J 3/226 523/212 |
| 5,985,953 | A |   | 11/1999 | Lightsey et al. |
| 6,013,353 | A |   | 1/2000  | Touhsaent |
| 6,180,710 | B1 |  | 1/2001  | Hergenrother et al. |
| 6,200,644 | B1 |  | 3/2001  | Owe et al. |
| 6,221,943 | B1 |  | 4/2001  | Hergenrother et al. |
| 6,228,908 | B1 |  | 5/2001  | Takeichi et al. |
| 6,342,552 | B1 |  | 1/2002  | Hergenrother et al. |
| 6,342,560 | B1 |  | 1/2002  | Okel |
| 6,348,531 | B1 |  | 2/2002  | Hergenrother et al. |
| 6,369,138 | B2 |  | 4/2002  | Hergenrother et al. |
| 6,384,117 | B1 |  | 5/2002  | Hergenrother et al. |
| 6,384,118 | B1 |  | 5/2002  | Hergenrother et al. |
| 6,384,125 | B1 |  | 5/2002  | Bergstrom et al. |
| 6,409,822 | B1 |  | 6/2002  | Prat et al. |
| 6,521,691 | B1 |  | 2/2003  | Agostini et al. |
| 6,525,118 | B2 |  | 2/2003  | Hergenrother et al. |
| 6,534,569 | B2 |  | 3/2003  | Mahmud et al. |
| 6,602,935 | B2 |  | 8/2003  | Prat et al. |
| 6,646,028 | B2 |  | 11/2003 | Lopez-Serrano Ramos et al. |
| 6,649,587 | B1 |  | 11/2003 | Frydman et al. |
| 6,649,684 | B1 |  | 11/2003 | Okel |
| 6,652,641 | B2 |  | 11/2003 | Kawazura |
| 6,736,891 | B2 |  | 5/2004  | Bice et al. |
| 6,756,079 | B2 |  | 6/2004  | van Ooij et al. |
| 6,790,889 | B2 |  | 9/2004  | Hergenrother et al. |
| 6,794,545 | B1 |  | 9/2004  | Frydman et al. |
| 6,809,176 | B2 |  | 10/2004 | Blokhin et al. |
| 6,982,351 | B2 |  | 1/2006  | Frydman |
| 7,015,271 | B2 |  | 3/2006  | Bice et al. |
| 7,056,449 | B2 |  | 6/2006  | Hoefler |
| 7,101,922 | B2 |  | 9/2006  | Chen et al. |
| 7,186,825 | B2 |  | 3/2007  | Frydman et al. |
| 7,235,695 | B2 |  | 6/2007  | Frydman et al. |

(Continued)

FOREIGN PATENT DOCUMENTS

CA    1336926    9/1995
EP    0350204    1/1990

(Continued)

OTHER PUBLICATIONS

Chujo; "Organic—Inorganic Nano-Hybrid Materials;" The Micrometrics, 50, 11-15, (200612007), pp. 255-260.
Schmitt; "Rubber/Filler Compound Systems in Powder Form—A New Raw Material Generation for Simplification of the Production Processes in the Rubber Industry Part 2: Powder Rubber based on E-SBRISilicalSilane;" Raw Materials and Applications, vol. 55, No. 10, (2002), pp. 502-511.
Badley et al.; "Surface Modification of Colloidal Silica;" Langmuir, 6, (1990), pp. 792-801.
Tamaki et al.; "Synthesis of IPN Polymer Hybrids by In-Situ Radical Polymerization Method and Their High Resistivity to Solvent Extraction;" Bull, Chem. Soc. Jpn., 71, (1998), pp. 2749-2756.

(Continued)

Primary Examiner — Christian Roldan
(74) Attorney, Agent, or Firm — Mary K. Cameron

(57) ABSTRACT

Disclosed is a container sealant composition with improved can sealing performance and reduced hot water absorption. The composition comprises a latex of a carboxylated styrene-butadiene rubber, a filler (preferably kaolin clay), an organosilane, and a tackifier. Also disclosed is a method of sealing a can with the aforedescribed container sealant composition.

12 Claims, No Drawings

(56) References Cited

U.S. PATENT DOCUMENTS

| | | |
|---|---|---|
| 7,253,207 B2 | 8/2007 | Blokhin et al. |
| 7,279,502 B2 | 10/2007 | Frydman et al. |
| 7,307,121 B2 | 12/2007 | Zhang et al. |
| 7,312,244 B2 | 12/2007 | Frydman et al. |
| 7,453,011 B2 | 11/2008 | Frydman et al. |
| 7,482,055 B2 | 1/2009 | Berlin et al. |
| 7,488,781 B2 | 2/2009 | Xu et al. |
| 7,687,107 B2 | 3/2010 | Okel et al. |
| 7,704,552 B2 | 4/2010 | Okel |
| 7,799,870 B2 | 9/2010 | Hergenrother et al. |
| 7,915,368 B2 | 3/2011 | Hergenrother et al. |
| 8,029,906 B2 | 10/2011 | Van Ooij et al. |
| 2002/0049282 A1 | 4/2002 | Obrecht et al. |
| 2002/0077420 A1* | 6/2002 | Chiba ............... C08L 23/10 525/89 |
| 2003/0171453 A1* | 9/2003 | Li ....................... C09D 11/16 523/160 |
| 2004/0077768 A1 | 4/2004 | Greenwood |
| 2004/0097600 A1 | 5/2004 | Greenwood et al. |
| 2005/0129930 A1 | 6/2005 | Berlin |
| 2005/0233937 A1 | 10/2005 | Greenwood et al. |
| 2007/0173597 A1 | 7/2007 | Williams et al. |
| 2008/0293872 A1 | 11/2008 | Loth et al. |
| 2009/0184157 A1 | 7/2009 | Sisler et al. |
| 2010/0163156 A1* | 7/2010 | Kishi .................. C08K 3/013 156/69 |
| 2010/0233060 A1 | 9/2010 | Kuehner et al. |
| 2013/0295291 A1* | 11/2013 | Crowley ............... C09D 7/63 427/387 |
| 2015/0027087 A1* | 1/2015 | Sun ..................... B65B 51/02 53/425 |
| 2015/0240131 A1* | 8/2015 | Furuya ............... C09D 123/04 429/185 |

FOREIGN PATENT DOCUMENTS

| | | | |
|---|---|---|---|
| EP | 0182674 | 9/1993 | |
| EP | 1554220 | 7/2005 | |
| EP | 1554220 A1 * | 7/2005 | ............ B82Y 30/00 |
| GB | 2084600 A | 4/1982 | |
| JP | 61145273 | 7/1986 | |
| JP | 02503691 A | 11/1990 | |
| JP | 04126739 A | 4/1992 | |
| JP | 05-271498 | 10/1993 | |
| JP | 10231381 A | 9/1998 | |
| JP | 2000-017224 | 1/2000 | |
| JP | 2000-063750 | 2/2000 | |
| JP | 3140389 B2 | 3/2001 | |
| JP | 2001-096676 | 10/2001 | |
| JP | 2003128942 A | 5/2003 | |
| JP | 2005146138 A | 6/2005 | |
| JP | 2008-308594 | 12/2008 | |
| JP | 2009184184 A | 8/2009 | |
| WO | 8202721 | 8/1982 | |
| WO | WO-8202721 A1 * | 8/1982 | ............... C08K 3/08 |
| WO | 9742028 | 11/1997 | |
| WO | 2004035473 | 4/2004 | |
| WO | 2008157217 | 12/2008 | |
| WO | 2013096360 | 6/2013 | |

OTHER PUBLICATIONS

PCT Search Report and Written Opinion for PCT/US2012/070451, dated Apr. 4, 2013.

PCT Search Report and Written Opinion for PCT/US2013/076409, dated Apr. 18, 2014.

* cited by examiner

CONTAINER SEALANT COMPOSITION

BACKGROUND OF THE INVENTION

The present invention relates to a container sealant composition with improved can sealing performance and reduced hot water absorption.

Container sealant compositions based on a rubbery polymer, such as styrene-butadiene rubber (SBR) and carboxylated styrene-butadiene rubber (CSBR) are well known in the art. In order to obtain acceptable water resistance, extrusion resistance and container seam performance, such compositions often include a crosslinking agent, such as a peroxide or zinc compound, to form a crosslinked network within the rubber component. Such sealant compositions also typically include a filler and a tackifier. Examples of such sealant compositions are disclosed in U.S. Pat. No. 4,189,418, WO 82/02721, EP 0182674, U.S. Pat. Nos. 5,747,579, and 8,211,254. However, the aforementioned patents do not suggest that organosilane would be useful with respect to container sealant compositions.

In U.S. Pat. No. 5,763,388 there is suggested a method of making aqueous compatibilized silica slurry that may be more readily blended with a rubber latex. Fumed silica and precipitated silica are mentioned for the silica dispersion. The aqueous compatibilized silica slurry is made by treating the silica dispersion with an organosilane coupling agent that includes a reactive functional group. It is suggested that this treatment allows the incorporation of greater quantities of compatibilized silica slurry in the rubber polymer. However, this patent does not suggest that the organosilane would be useful with respect to carboxylated rubbers or that it would be useful with respect to container sealant compositions.

In U.S. Pat. Nos. 6,756,079 and 8,029,906 there are suggested compositions and methods for treating metal substrates with aminosilanes. These aminosilane coatings protect the metal substrate from corrosion and form a base for adhering rubber-like polymeric compositions to the metal. However, these patents do not suggest that organosilanes would be useful with respect to carboxylated rubbers or with respect to container sealant compositions.

SUMMARY OF THE INVENTION

The present invention embraces a container sealant composition comprising a latex of a carboxylated styrene-butadiene rubber (CSBR), a filler, an organosilane, and a tackifier. The filler may be selected from the group consisting of clay, particularly kaolin clay, precipitated silica, silica gel, titanium dioxide, calcium carbonate, alumina white, calcium sulfate, aluminum hydroxide, talc, and a combination of two or more of these materials. Preferably, the filler comprises kaolin clay.

The present invention also includes a method for sealing a can. The method comprises coating an aqueous dispersion of the container sealant composition according to the present invention onto the curl area of a can cap, drying the composition, placing the coated can cap onto a can body filled with contents, and sealing the can by seaming the flange area of the can body and the curl area of the cap to obtain a sealed can containing the contents. The method may additionally include subjecting the sealed can to a heat treatment to sterilize the contents.

DETAILED DESCRIPTION OF THE INVENTION

The container sealant composition of the present invention comprises a latex of a carboxylated styrene-butadiene rubber (CSBR). The CSBR may be any of those conventionally used to form container sealant compositions. Typical CSBR's are disclosed in U.S. Pat. No. 5,747,579 and include copolymers of styrene and butadiene with a carboxylic acid such as fumaric acid, acrylic acid, methacrylic acid, itaconic acid, aconitic acid, maleic acid or corotonic acid or with an anhydride such as maleic anhydride or itaconic anhydride. A preferred CSBR is a copolymer of styrene and butadiene with acrylic acid. Generally, the amount of acid (or anhydride) copolymerized with the styrene-butadiene will be about 0.5% to 6% by weight of the elastomer. The proportion of styrene and butadiene will typically range from 30% to 70% for each component, based on 100 parts of styrene plus butadiene (i.e., 30 to 70 phr (phr=parts per hundred parts rubber)). Typically, the amount of butadiene is about 35% to 55%, while the amount of styrene is about 45% to 65%. Typically, the CSBR has a gel content of 0 to 70 wt. %, a Mooney viscosity of 30 to 150 ($ML_{1+4}$, 100° C.) and a styrene content of 20 to 60 wt. %. The CSBR latex will typically comprise about 40% to 70% total rubber solids.

The container sealant composition additionally includes a filler. The filler preferably is selected from the group consisting of clay, particularly kaolin clay, precipitated silica, silica gel, titanium dioxide, calcium carbonate, alumina white, calcium sulfate, aluminum hydroxide, talc, and a combination of two or more of these materials. Preferably, the filler comprises kaolin clay. Typically, the composition will include about 5 to 80 parts by weight of filler per 100 parts by weight of CSBR (i.e., 5 to 80 phr), preferably about 10 to 50 parts by weight of clay filler per 100 parts by weight of CSBR (i.e., 10-50 phr). This results in a CSBR to clay ratio of 100:5 to 100:80, preferably 100:10 to 100:50. Preferably, the container sealant composition is substantially free (i.e., less than 0.5%, preferably less than 0.1%, by weight), most preferably completely free, of colloidal silica.

The container sealant composition additionally includes an organosilane. The organosilane includes a functional group that will react with the carboxyl group in CSBR to build a network structure in the rubber system. It is theorized that formation of such a network structure provides reduced hot water absorption and improved can sealing performance without the need for a crosslinking agent. Thus, in a preferred embodiment, the container sealant composition is substantially free (i.e., less than 0.1% by weight), most preferably completely free, of crosslinking agent. The amount of the organosilane can be varied within relatively wide limits, e.g., 1 to 15 parts of organosilane per 100 parts by weight of filler (e.g., clay), preferably 3 to 10 parts by weight of organosilane per 100 parts by weight of filler.

Suitable organosilanes include those having the general formula

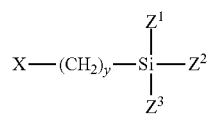

wherein X is a functional group selected from the group consisting of an amino group, a polyamino alkyl group, a mercapto group, a polysulfide group, an epoxy group, a hydroxy group, a vinyl group, an acryloxy group and a methacryloxy group; y is 0 to 8, preferably 2 to 6; and $Z^1$, $Z^2$ and $Z^3$ are each independently selected from the group consisting of hydrogen, $C_1$ to $C_{18}$ alkyl, aryl such as phenyl, benzyl and the like, cycloalkyl such as cyclopentyl, cyclohexyl, etc., or aryl, alkoxy or halo substituted alkyl, and $C_1$ to $C_8$ alkoxy group, with the proviso that at least one of $Z^1$, $Z^2$ or $Z^3$ must be one of the foregoing alkoxy groups or one of the Z's must be a halogen, hydroxyl, or hydrogen group.

Representative of such organosilanes that are commercially available include 3-aminopropyltrimethoxysilane, 3-aminopropyltriethoxysilane, 3-aminopropyldimethylethoxysilane, 3-aminopropyldihydroxymethoxysilane, N-(2-aminoethyl)-3-aminopropyltrimethoxysilane, N-(2-aminoethyl)-3-aminopropyltriethoxysilane, N-methyl-aminopropyltrimethoxysilane, 3-hydroxypropyl-tripropoxysilane, 3-mercaptopropyltriethoxysilane, glycidylpropyltrimethoxysilane, 3-methacryloxypropyltriethoxysilane, 3-methacryloxy-propyltrimethoxysilane, 2-mercaptoethyltriethoxysilane, 3-thiocyanato-propyltriethoxysilane, bis-(3-triethoxythiopropyl)tetrasulfide, vinyltriethoxysilane, vinylphenylmethylsilane, vinyldimethylmethoxysilane, divinyldimethoxysilane, divinylethyldimethoxysilane, dimethylvinyl-chlorosilane, and the like. Preferred organosilanes are the amino-organosilanes, and particularly preferred are 3-aminopropyltriethoxysilane and N-(2-aminoethyl)-3-aminopropyltrimethoxysilane. Preferably, the organosilane is added to the composition after the filler has been added.

The container sealant composition preferably additionally includes a tackifier. The tackifier may be selected from any those commonly used in container sealant compositions. Generally, the tackifier may include at least one material selected from the group consisting of rosin-based resins (e.g., rosin, hydrogenated rosin, rosin ester, hydrogenated rosin ester), terpene-based resins (e.g., α-pinene, β-pinene, dipentene), phenol-formaldehyde-based resins and petroleum hydrocarbon-based resins. The amount of the tackifier included in the composition may be varied, but will typically be included in an amount of about 10 to 150 parts, preferably 15 to 100 parts, by weight per 100 parts by weight (solids) of the rubber component (i.e., 10 to 150 phr, preferably 15 to 100 phr).

When the filler comprises kaolin clay, the container sealant composition may also comprise an additional filler. Such additional filler may be at least one material selected from the group consisting of silica, titanium dioxide, calcium carbonate, alumina white, calcium sulfate, aluminum hydroxide and talc. The amount of the additional filler may be varied, but will typically be included in an amount of about 5-150 parts by weight per 100 parts by weight (solids) of the rubber component (i.e., 5 to 150 phr).

The container sealant composition may also include minor amounts of other additives such as colorants (e.g., carbon black), antioxidants, thickeners (e.g., bentonite, karaya gum, methyl cellulose), bactericides, surfactants, and pH adjusters.

The above-described container sealant composition is advantageously used to seal a can. Generally, the method comprises coating an aqueous dispersion of the container sealant composition onto the curl area of a can cap, drying the composition, placing the coated can cap onto a can body filled with contents, and sealing the can by seaming the flange area of the can body and the curl area of the cap to obtain a sealed can containing the contents. The method may additionally include subjecting the sealed can to a heat treatment to sterilize the contents. The sealant composition of the present invention provides improved can sealing performance, thus forming a better seal, as well as reduced hot water absorption.

Example 1

This example demonstrates the improvements resulting from the container sealant compositions of the present invention. The organosilane (when present) is added slowly, while stirring, into kaolin clay dispersed CSBR latex in the amounts shown in Table 1, then these mixtures are stirred for 15 to 20 minutes at 200 to 300 rpm. The remaining ingredients are added to this dispersion, which is stirred for one hour then defoamed under vacuum. The results are shown in Table 1.

TABLE 1

| | Amount (parts by weight) | | | | |
|---|---|---|---|---|---|
| | A | B | C | D | E[4] |
| Ingredient | | | | | |
| Organosilane[1] | 1.8 | 0 | 1.8 | 0 | 0 |
| CSBR (solid)[2] | 100 | 100 | 100 | 100 | |
| SBR (solid) | | | | | 100 |
| Kaolin Clay | 30 | 30 | 30 | 30 | 30.3 |
| Stabilizer[3] | 0 | 0 | 1.2 | 1.2 | 1.2 |
| Other ingredients (incl. tackifier) | 39 | 39 | 39 | 39 | 89 |
| Hot water absorption of dried film | | | | | |
| Immersion for 1 minute (%) | 1.1 | 3.0 | 6.5 | 10.3 | 16.6 |
| Immersion for 3 minutes (%) | 2.7 | 5.3 | 7.5 | 18.1 | 30.0 |
| Can pack test results | | | | | |
| Number of cans with leakage after impact (n = 100) | 0 | 8 | 5 | 11 | 15 |

[1]N-(2-aminoethyl)-3-aminopropyltrimethoxysilane (KBM603; ShinEtsu)
[2]XQ 83286.01 (50% CSBR solids; Siam Synthetic Co., Ltd)
[3]Stylene Maleic Anhydride Copolymer (Scripset 540; Hercules)
[4]WBC103S-2 (Typical Japanese water based sealant available from W. R. Grace)

A typical water based container sealant composition (E) shows high water absorption, 16.6% and 30.0%, in dried films after immersing in hot water (>90° C.) respectively for 1 and 3 minutes. The hot water absorption of composition (E) is reduced to 10.3% and 18.1% in composition (D) by the replacement of SBR by CSBR and formula simplification. In addition, the hot water absorption of composition (D) is reduced significantly to 1.1% and 2.7% by stabilizer elimination and addition of organosilane in composition (A). It can be seen that addition of organosilane to other formulations (A from B, and C from D) also contributes to improved can sealing performance.

Example 2

A container sealant composition is prepared having the ingredients listed below.

| Ingredient | Dry Weight (PHR) |
|---|---|
| CSBR [1] | 100 |
| Aluminum-silicate (Kaolin clay)[2] | 30 |
| Amino-organosilane[3] | 1.8 |
| Titanium dioxide | 5 |
| Tackifier[4] | 30 |
| Thickener[5] | 2.16 |
| Carbon black | 0.3 |
| Dispersant[6] | 0.34 |
| Antioxidant[7] | 1 |

[1] XQ 83286.01 (50% CSBR solids; Siam Synthetic Co., Ltd)
[2]Buca Clay filler (BASF Catalyst)
[3]N-(2-aminoethyl)-3-aminopropyltrimethoxysilane (KBM603; ShinEtsu)
[4]Blend of Aqueous Dispersion of Polymerized Rosin Ester (10 phr Foralaxe from Eastman Chemical), Hydrogenated Ester Rosin (20 phr Forelyn 5020-F from Eastman Chemical)
[5]Methyl cellulose (1.76) and Karaya gum (0.4)
[6]Naphthalene sulfonic acid, formaldehyde, Na (0.1) and Sodium Carbonate (0.24)
[7]Tetrakis methylene ditertbutylhydroxycinnamate methyl The amino-organosilane is added slowly, while stirring, into clay dispersed CSBR latex, then these mixtures are stirred for 15 to 20 minutes at 200 to 300 rpm. The remaining ingredients are added to this dispersion, which is stirred for one hour then defoamed under vacuum.

The above-described composition is used to seal a can in the conventional manner. The aqueous dispersion of sealant composition is coated onto the curl area of a can end (or can cap) using a reciprocal liner and heat-dried in an air circulating oven at 90° C. for ten minutes. A 190 ml can is filled with hot liquid (e.g., boiled water to simulate food contents), then the can end is placed on the filled can and seamed using a reciprocal double seamer. The seamed can is then subjected to heat sterilization (e.g., 125° C. for 30 min.), then allowed to cool to room temperature. The can exhibits substantially improved can sealing performance.

What is claimed is:

1. A container sealant composition comprising:
a latex of a carboxylated styrene-butadiene rubber (CSBR) solids;
a kaolin clay filler in combination with one or more fillers consisting of materials selected from the group consisting of clay, precipitated silica, silica gel, titanium dioxide, calcium carbonate, alumina white, calcium sulfate, aluminum hydroxide, and talc;
an organosilane; and
a tackifier;
wherein the container sealant composition further comprises an additional filler, different from the kaolin clay filler and the one or more fillers, wherein the additional filler comprises at least one material selected from the group consisting of titanium dioxide, calcium carbonate, alumina white, calcium sulfate, aluminum hydroxide and talc, and wherein the container sealant composition comprises 5-150 parts by weight of the additional filler per 100 parts by weight of the carboxylated styrene-butadiene rubber (CSBR) solids, and
wherein the container sealant composition has a weight ratio of the carboxylated styrene-butadiene rubber (CSBR) solids to fillers that ranges from 100:5 to 100:80; the container sealant composition being a stabilizer-free aqueous liquid and comprising less than 0.5% by weight of colloidal silica.

2. The container sealant composition according to claim 1, wherein the weight ratio of the carboxylated styrene-butadiene rubber (CSBR) solids to the fillers ranges from 100:10 to 100:50.

3. The container sealant composition according to claim 1, wherein the organosilane has the general formula

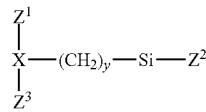

wherein X is a functional group selected from the group consisting of an amino group, a polyamino alkyl group, a mercapto group, a polysulfide group, an epoxy group, a hydroxy group, a vinyl group, an acryloxy group and a methacryloxy group; y is 0 to 8; and $Z^1$, $Z^2$ and $Z^3$ are each independently selected from the group consisting of hydrogen, $C_1$ to $C_{18}$ alkyl, aryl such as phenyl, benzyl and the like, cycloalkyl such as cyclopentyl, cyclohexyl, or aryl, alkoxy or halo substituted alkyl, and $C_1$ to $C_8$ alkoxy group, with the proviso that at least one of $Z^1$, $Z^2$ or $Z^3$ must be one of the foregoing alkoxy groups or one of the Z's must be a halogen, hydroxyl, or hydrogen group.

4. The container sealant composition according to claim 3, wherein the organosilane is selected from the group consisting of 3-aminopropyltrimethoxysilane, 3-aminopropyltriethoxysilane, 3-aminopropyldimethylethoxysilane, 3-aminopropyldihydroxymethoxysilane, N-(2-aminoethyl)-3-aminopropyltrimethoxysilane, N-(2-aminoethyl)-3-aminopropyltriethoxysilane, and N-methyl-aminopropyltrimethoxysilane.

5. The container sealant composition according to claim 3, wherein the organosilane is N-(2-aminoethyl)-3-aminopropyltrimethoxysilane.

6. The container sealant composition according to claim 1, comprising 1 to 15 parts by weight of the organosilane per 100 parts by weight of the filler.

7. The container sealant composition according to claim 1, wherein the tackifier is at least one member selected from the group consisting of rosin-based resins, terpene-based resins, phenol-formaldehyde-based resins, and petroleum hydrocarbon-based resins and the 10-150 parts by weight of the tackifier per 100 parts by weight of the carboxylated styrene-butadiene rubber (CSBR) solids.

8. The container sealant composition according to claim 1, wherein the carboxylated styrene-butadiene rubber (CSBR) has a gel content of 0 to 70 wt. %, a Mooney viscosity of 30 to 150 ($ML_{1+4}$, 100° C.) and a styrene content of 20 to 60 wt. %.

9. The container sealant composition according to claim 1, wherein the composition is free of crosslinking agent.

10. The container sealant composition according to claim 1, wherein the composition contains less than 0.1% by weight of colloidal silica.

11. A method for sealing a can which comprises coating a curl area of a can cap with an aqueous dispersion of the container sealant composition according to claim 1, drying the container sealant composition, placing the can cap onto a can body filled with contents, and sealing the can by seaming a flange area of the can body and the curl area of the can cap to obtain a sealed can containing the contents.

12. The method according to claim 11 additionally comprising subjecting the sealed can to a heat treatment to sterilize the contents.

* * * * *